March 15, 1932.   F. H. PALSER   1,849,636
APPARATUS FOR REPRODUCING SOUND FILM RECORDS
Filed Feb. 13, 1930   5 Sheets-Sheet 1

FIG.1.

INVENTOR
FRED H. PALSER
ATTORNEY

Fig.3.

March 15, 1932.  F. H. PALSER  1,849,636
APPARATUS FOR REPRODUCING SOUND FILM RECORDS
Filed Feb. 13, 1930  5 Sheets-Sheet 4

FIG.4.

INVENTOR
FRED H. PALSER
BY
ATTORNEY

March 15, 1932.   F. H. PALSER   1,849,636
APPARATUS FOR REPRODUCING SOUND FILM RECORDS
Filed Feb. 13, 1930    5 Sheets-Sheet 5

INVENTOR
FRED H. PALSER
BY
Eric Schinger.
ATTORNEY

Patented Mar. 15, 1932

1,849,636

UNITED STATES PATENT OFFICE

FRED H. PALSER, OF ROCHESTER, NEW YORK, ASSIGNOR TO WEBER MACHINE CORPORATION, A CORPORATION OF NEW YORK

APPARATUS FOR REPRODUCING SOUND FILM RECORDS

Application filed February 13, 1930. Serial No. 428,088.

This invention relates to an apparatus for reproducing sound records and more particularly for reproducing sound records which are combined with motion pictures and are photographed on the same film with the motion pictures, and the object of this invention is to provide a reproducing apparatus which is simple in construction and perfect in its operation and can be readily attached to and operated in conjunction with the projection apparatus to reproduce the sound record portion of the film in synchronism with the projection of the pictures by the projection apparatus.

Another object of this invention is to provide an improved and simplified film control unit including a film control wheel with which only the uncoated side of the film makes contact as it passes over it.

Another object of this invention is to so construct this film control unit that frictional contact of the film is eliminated with any part surrounding the fixed light cell chamber and the aperture through which the light rays are projected into the chamber and onto the light sensitive cell.

Another object of this invention is to provide governor means in combination with the film control wheel so as to insure an even feed of the film by the film sprocket.

Another object of this invention is to provide an automatic switch which stops the apparatus when the film breaks in its passage thru the apparatus and thus prevents the feeding of film into the apparatus when it is no longer connected to the receiving film reel.

Another object of this invention is to provide the apparatus with a reserve exciter lamp and means with which it can be instantaneously swung in place of a burned out exciter lamp and automatically connected into the electric circuit thereof.

These and other objects of this invention will be apparent from the drawings, the specification and the appended claims forming a part thereof.

The method used in reproducing the sound record by means of the apparatus forming the subject matter of this invention consists in projecting light rays of constant luminosity thru a portion of the record film while the film is moved constantly at a uniform speed in front of an aperture and in such relation thereto, that only light rays from the illuminated portion of the record film are allowed to pass therethru. The varying capacity of the record film produces variations in the light rays passing thru the aperture and these variations in the light rays are projected onto a light sensitive cell. This cell is connected in an electric circuit which includes a sound reproducing device so that in accordance with the variations in the light rays passing thru the record film and the aperture, the light sensitive cell will produce variations in the resistance of the electric circuit and cause varying impulses in this circuit to actuate the sound reproducing device.

As illustrated in the figures of the drawings the apparatus includes a suitable casing 1 in which the various parts of the mechanism are either housed within or are supported without. The casing is constructed so that it can be interposed between the projection apparatus proper and its supporting standard including the receiving reel, but as none of these form any part of the present invention they have not been illustrated and no further description is given. The film, carrying the sound record and the motion pictures, is fed from the supply reel thru the projection apparatus which projects the picture portion of the film on the screen. Immediately after leaving the projection apparatus the film is fed to the sound reproducing apparatus and enters casing 1 thru an opening in the top, passing out again thru another opening in the bottom thereof where the film is finally wound up on the receiving reel which is mounted in a suitable housing supported by the standard of the projection apparatus. Within the sound reproducing apparatus the film record operates the electric circuit of the sound reproducing device and translates the record into actual sound.

The source of light rays of constant luminosity is furnished by an exciter lamp 2 which is mounted together with a reserve exciter lamp on an arm 3. This arm is pivotally supported on the bracket 4 located on the outside of the casing 1 and can be turned by means of the knob 6 to swing either the one or the other of the exciter lamps in line with the optical system 5. The reserve lamp can thus be instantaneously moved in place of the other lamp should it burn out, and the electric connection for the exciter lamp is so arranged that the reserve lamp is automatically cut into the electric circuit when it is swung in place of the burned out lamp.

The light rays from the exciter lamp enter the casing 1 thru the optical system 5 which is mounted in a tube which is clamped in place in the adjustable bracket 7. This bracket is provided at the back with two radial ridges 8 and 9 which are in line with each other and are located vertically one above and the other below the tube surrounding the optical system 5. The clamping screws 10 and 10 with which the bracket is fastened to the inside of the casing pass thru suitable holes in the casing and are threaded into holes in the bracket 7 which are located between the ridges 8 and 9 and to one side thereof. Bracket 7 is thus rigidly clamped to the inside of the housing but by adjusting the clamping screws the bracket can also be rocked horizontally to swing the optical system thru a limited horizontal arc. This is necessary in order to be able to properly align the optical system and direct the light rays thru the record film onto the light sensitive cell.

The film enters the casing thru the opening 11 and passes around the under side of the idle roller 12 onto and over the major portion of the perimeter of the control wheel 13, thence to the second idle roller 14 to the film sprocket 15 and from the film sprocket to a third idle roller 16 and over it out thru the opening 17 in the bottom of the casing between the fire rollers 18 and 19.

Figure 1:
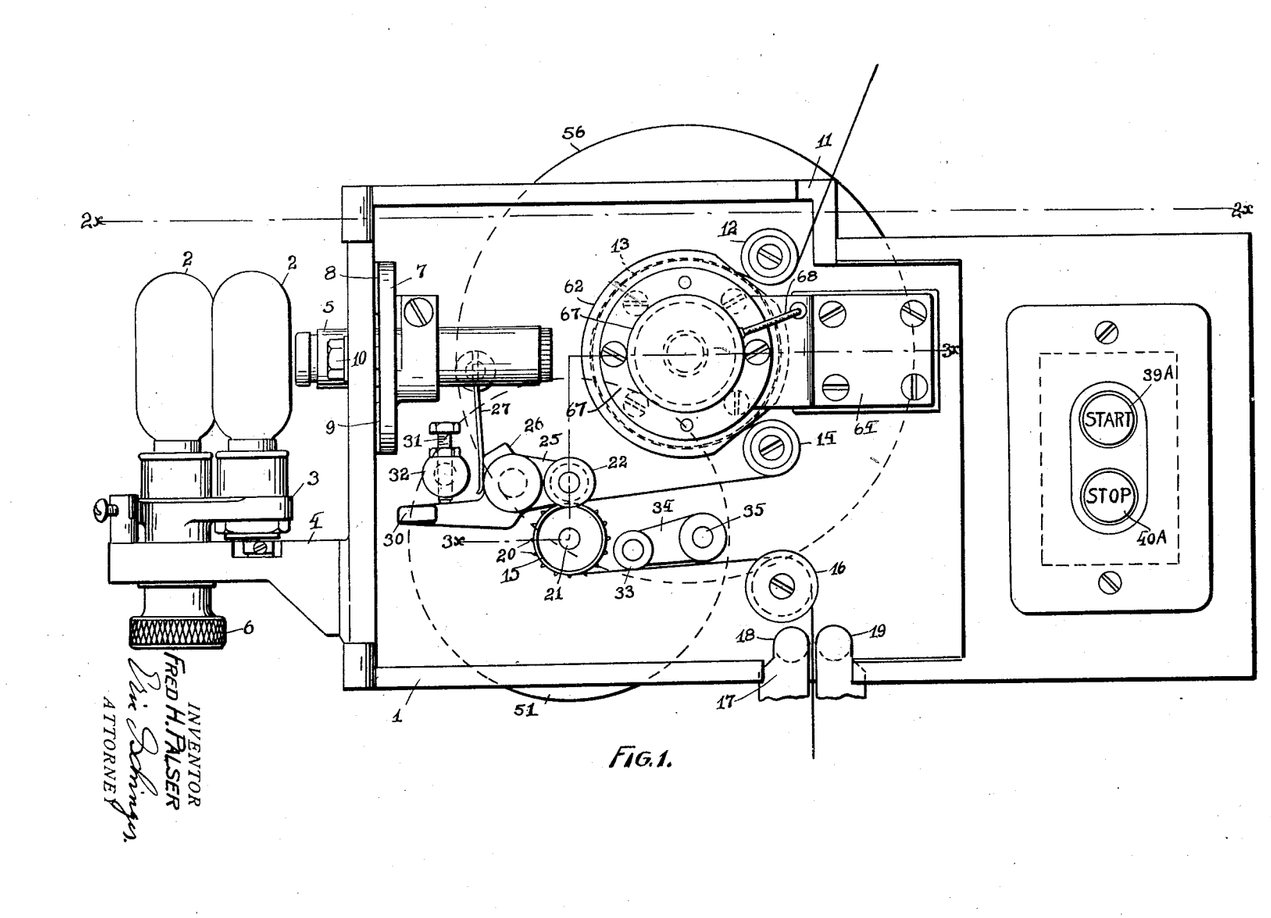
Figure 1 is a side elevation of the sound reproducing apparatus with the door removed to show the mechanism thereof.
Figure 2:
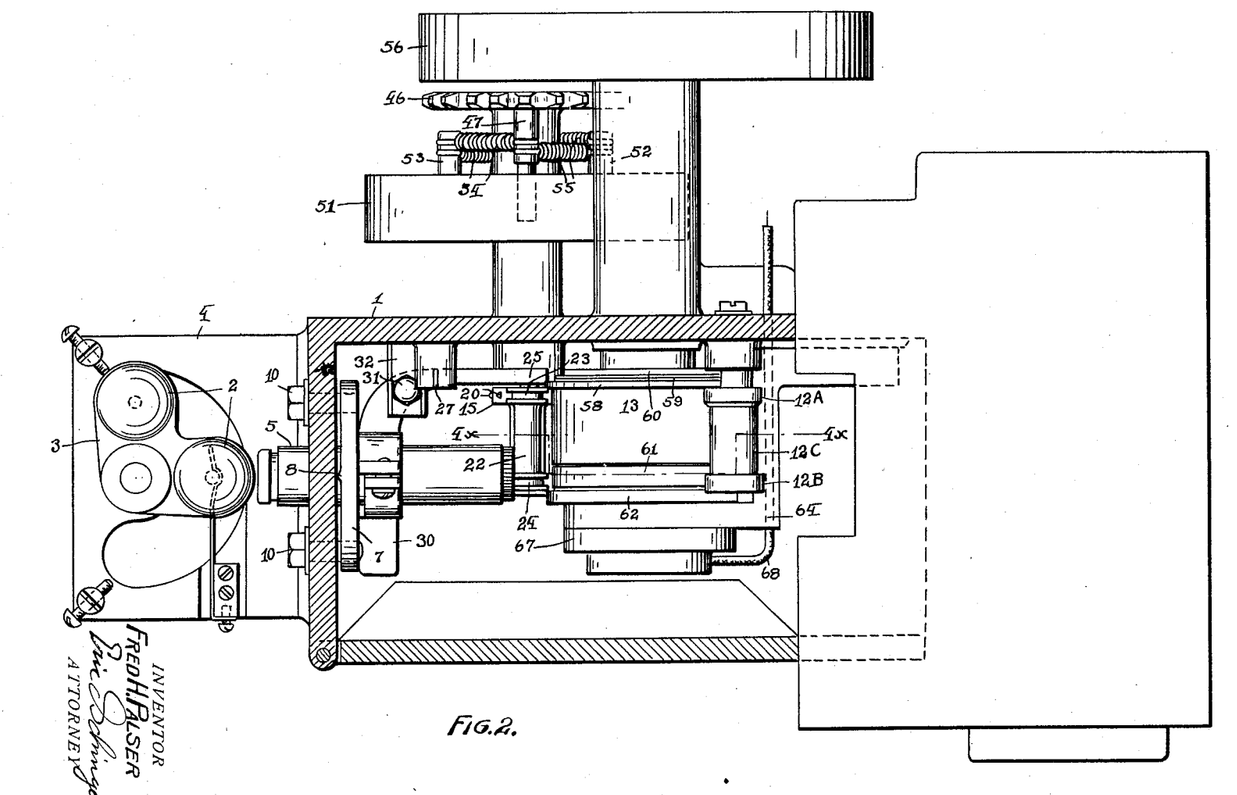
Figure 2 is a horizontal sectional view of the apparatus, the section being taken on the line 2x—2x of Figure 1.

As illustrated in Figure 2 the idle roller 12 is built up of two ball bearings 12A and 12B with a spacing sleeve 12C located between them. But a small portion of the edge of the film is thus brought into contact with the idler as the emulsion coated side of the film passes under it. On the other hand, the contact of the film with the control wheel is of considerable length but is with the uncoated side thereof so that the long contact of the film with the control wheel cannot in any way be detrimental to the emulsion on the film. Idle roller 14 is built up in the same way as idle roller 12 so that only a small portion along the edge of the film comes in contact with this roller. The same is true of the film sprocket 15 which is cut away in the middle so that only a small portion of the flange on either side of the teeth 20 thereof comes in contact with the film as it travels over it. The film sprocket is mounted on the shaft 21 to which the driving power for the apparatus is applied in order to positively feed the film thru the casing as will hereinafter be described.

In order to keep the film in positive engagement with the teeth of the film sprocket, a spring pressed film roller 22 is mounted over the film sprocket at the point where the teeth of the sprocket engage into the perforations provided in the film. This roller is provided with a pair of annular grooves 23 and 24 which allow the teeth of the driving sprocket to project into them while the flanges on each side of the grooves prevent the film from becoming disengaged with the teeth of the film sprocket. The spring pressed roller is mounted to rotate on a pivot pin carried by the swinging bracket 25 which is suitably pivoted on the inside of the casing 1. A lug 26, having two adjacent flat faces at predetermined angles to each other, is provided on the bracket 25 and a flat spring finger 27 is adapted to make contact with either the one or the other of these two surfaces in order that its pressure will force the roller either into contact with the film, as above described, or hold the bracket in a position in which the roller is out of contact with the film. The latter position is occupied by the roller when the film is placed over the film sprocket on the insertion of the film into the apparatus. In order to facilitate the placing of the roller into the two positions the swinging bracket 25 is provided with an outwardly curved handle 30 which extends to within a short distance of the outside of the casing where it can readily be manipulated by the operator and moved up or down against the pressure of the spring finger 27. To prevent the film roller from bearing down onto the film as it passes over the driving sprocket an adjustable stop is provided in the form of a set screw 31 mounted in the lug 32. This set screw makes contact with the top of the swinging bracket 27 and by threading it up or down in the lug the initial position of the bracket and that of the roller may be changed to set and hold the roller properly spaced from the film sprocket.

Figure 5:
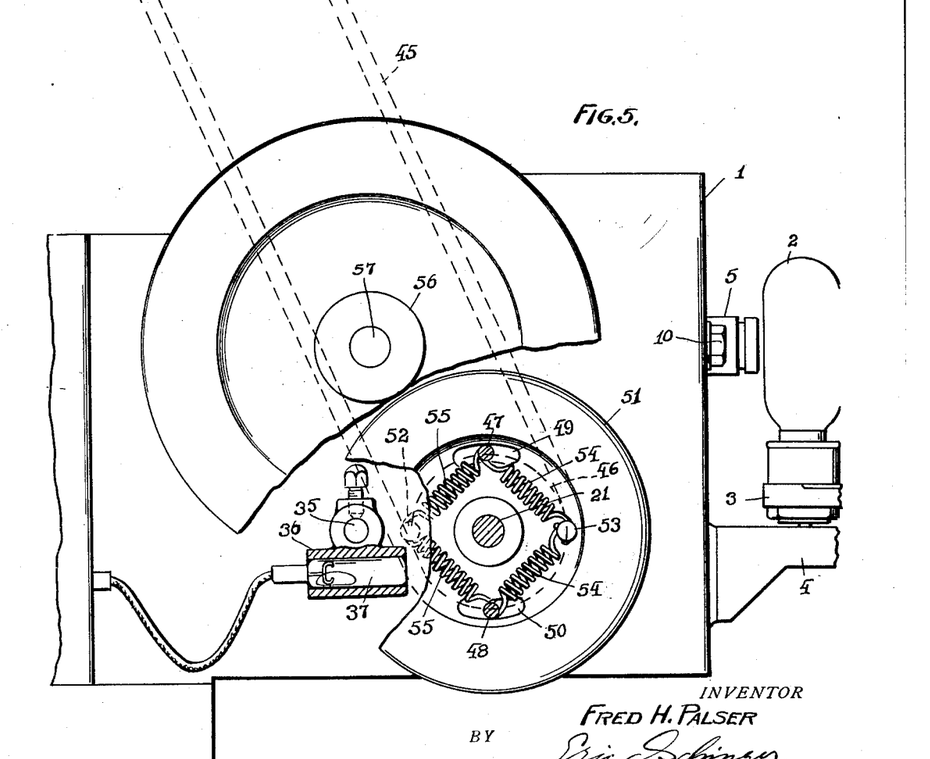
Figure 5 is an elevation of the side of the apparatus opposite to that illustrated in Figure 1 with parts of it partly broken away.

At a point intermediate of the driving sprocket 15 and the third idle roller 16 a roller 33 is allowed to rest on top of the film. The roller 33 is pivoted on an arm 34 which is carried on the rocking shaft 35. This shaft extends thru a bearing in the casing 1 and carries on the outer end thereof a cradle 36. In the cradle is mounted the mercury switch 37 which, when rocked by the cradle, opens the electric circuit of the driving motor and stops the apparatus. Normally the cradle with the mercury switch is held in the position illustrated in Figure 5. In this position the roller 33 is supported by the film passing from the film sprocket 15 to the idle roller 16 and holds the arm 34 in a practically horizontal position. When the end of the film has passed the film sprocket, or for any reason the film has become broken and the broken end has passed the film sprocket, the roller 33 will no longer be supported by the film but will drop and rock the arm 34 and shaft 35 causing the cradle with the mercury switch to assume an angular position in which the mercury will flow away from the electrodes of the switch and break the electric circuit of the driving motor. This automatically stops the apparatus.

When a film breaks the operator hastily corrects the trouble and to prevent him from starting the apparatus prematurely in the excitement by means of the mercury switch, this switch is connected in series with a relay and a set of manually operated switches, one of which must be operated after the mercury switch is closed again and held closed by the renewed support of the roller 33 by the film before the apparatus will start.

Figure 6:
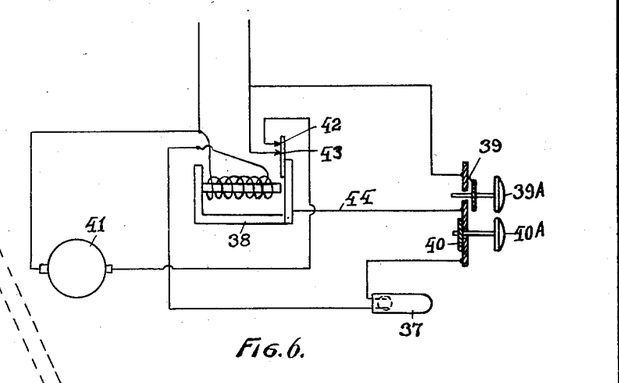
Figure 6 is a diagrammatic view of the electric circuit of the motor for driving the apparatus, illustrating the various switches which manually and automatically are operated to start and stop the motor.

The electric circuit including the mercury switch 37, relay 38 and starting and stopping switches 39 and 40 respectively are diagrammatically illustrated in Figure 6. As illustrated in this figure the starting switch 39 is operated by the push button 39A and the stopping switch is operated by the push button 40A. The driving motor is indicated by reference numeral 41. Before starting, the mercury switch is closed and held closed by the insertion of the film into the apparatus. Starting switch 39 is, however, normally held open so that to begin with no current can flow from one side of the electric current source to the mercury switch. The mercury switch controls the current for energizing the relay 38 which in turn controls the current from the supply line to the motor 41 by means of the double contacts 42 and 43 which are connected by the armature of the relay when the same is energized. To start the apparatus the push button 39A must therefore be operated first. This closes the switch 39 and completes the circuit thru this switch, the stop switch 40, which is normally held closed and the mercury switch 37 which is held closed by the film, thus energizing the relay 38. The relay then operates to close the circuit of the driving motor by connecting the contacts 42 and 43. The starting switch 39 is opened immediately on the release of its push button but the relay circuit continues to be energized thru the shunt circuit 44 which connects the motor circuit with the mercury switch thru the stop switch 40. The motor circuit thus remains closed until either the mercury switch 37 or the stop switch 40 is operated to open the relay circuit which de-energizes the relay and causes the motor circut to be opened between the double contacts 42 and 43. To start the apparatus, not only the mercury switch must therefore be closed but the starting switch must be operated as well and this precludes any possible premature starting of the motor until the film is properly placed and ready to be fed thru the apparatus.

The driving power from the motor is applied to the projection apparatus and from the projection apparatus it is applied by means of a sprocket chain 45 to the sprocket 46 mounted to rotate on the outer end of the shaft 21 carrying the film sprocket 15. Anchored in the web of the sprocket 46 are a pair of pins 47 and 48 which project into the elongated slots 49 and 50 provided in the web of the governor wheel 51. In the web of the governor wheel are also anchored a pair of pins 52 and 53 and expansion springs 54, 54 and 55, 55 connect the pins 47 and 48 of the sprocket 46 with the pins 52 and 53 respectively of the governor wheel. A yielding connection between the sprocket and the governor wheel and the shaft 21 on which the governor wheel is carried is thus secured. Due to this yielding connection any irregularity in the driving speed that is transmitted from the projection apparatus to the sprocket 46 is thus absorbed by the springs which yield to the irregularity in the speed while the momentum of the governor wheel keeps the shaft 21 rotating at a uniform speed. The speed with which the film sprocket 15 feeds the film thru the apparatus is thus kept uniform at all times. In order for the governor wheel to operate as above pointed out, a certain amount of resistance must be set up in the film against which the film sprocket must feed the film. This resistance is supplied by the momentum of the fly wheel 56 which is carried on the shaft 57 on which the control wheel 13 is mounted. As above described the film makes contact with the greater portion of the perimeter of the control wheel in its travel thru the apparatus and the contact of the moving film with the control wheel rotates the control wheel, the shaft on which it is carried and the fly wheel 56 keyed to the outer end of this shaft. The fly wheel, after it has attained the proper momentum thus serves as an additional control member which keeps the film moving at a uniform rate of speed while it travels over the control wheel and sets up the necessary resistance in the film against which the film is drawn by the sprocket wheel 15 to keep it tightly wound over the control wheel. A rolling contact is thus constantly maintained between the rotating control wheel and the moving film so that all friction between the two is eliminated and the film kept smooth while in contact with the central wheel.

The control wheel 13 has a width which is less than that of the film by an amount equal to the width of the sound record of the film plus that of the perforated edge of the film on the outside of the sound record. Only the film portion of the film and the other perforated edge thereof is thus brought in contact with the perimeter of the control wheel. A yielding edge guide 58 is carried by the control wheel and is yieldingly held against the edge of the film by the spring washer 59 that is interposed between the film guide and the flange 60 fastened to the inner end of the control wheel. At the outer end the control wheel is supplemented by a stationary circular flange 61 and the stationary edge guide 62. The circular flange 61 is of slightly smaller diameter than the outside diameter of the control wheel 13 so that the overhanging portion of the film is traveled over the stationary circular flange without making frictional contact with it. The film is guided between the fixed guide 62 and the yielding guide 58 in its travel over the control wheel, while the speed with which it travels over the control wheel is held uniform by the momentum of the fly wheel 56.

The inside of the control wheel 13 is hollow and the inner edge of the stationary circular flange 61 has a short extension of reduced diameter which projects into it. The clearance in the joint thus formed between the stationary flange and the edge of the control wheel and the inside thereof is very small and its right angular surfaces form a light lock which will exclude all light from the inside of the control wheel except that admitted thru the aperture 63 provided in the stationary circular flange 61 as will hereinafter be described. The stationary circular flange and its rigid edge guide is supported by the bracket 64 which is fastened to the inside of the casing and extends along one side of the control wheel to the front of the rigid edge guide 62 which is suitably attached thereto. Both the rigid edge guide and the bracket which supports it concentrically with its circular flange in front of the control wheel 13, are provided with a central opening for the insertion of the light-sensitive cell 65. This cell is surrounded by a metal shield 66 and the space between the shield and the outside of the cell is filled with a shock absorbing material which cushions the cell within the shield. Both the shield and the cell are mounted and supported in the cap 67 which is suitably fastened to the outside of the bracket 64 so that the cell and the shield that surrounds it project into the inside of the control wheel and are concentrically held in place within the control wheel and the stationary circular flange 61. Of the two wire leads of the light sensitive cell, one is grounded while the other is connected to the cable 68 that forms part of the electric circuit of the sound reproducing device (not shown). The cable 68 is preferably surrounded with a grounded shield 69 and the grounded lead wire of the light sensitive cell and the grounded cable shield are preferably connected to provide an efficient ground connection for the electric circuit of the sound reproducing device.

Figure 3:
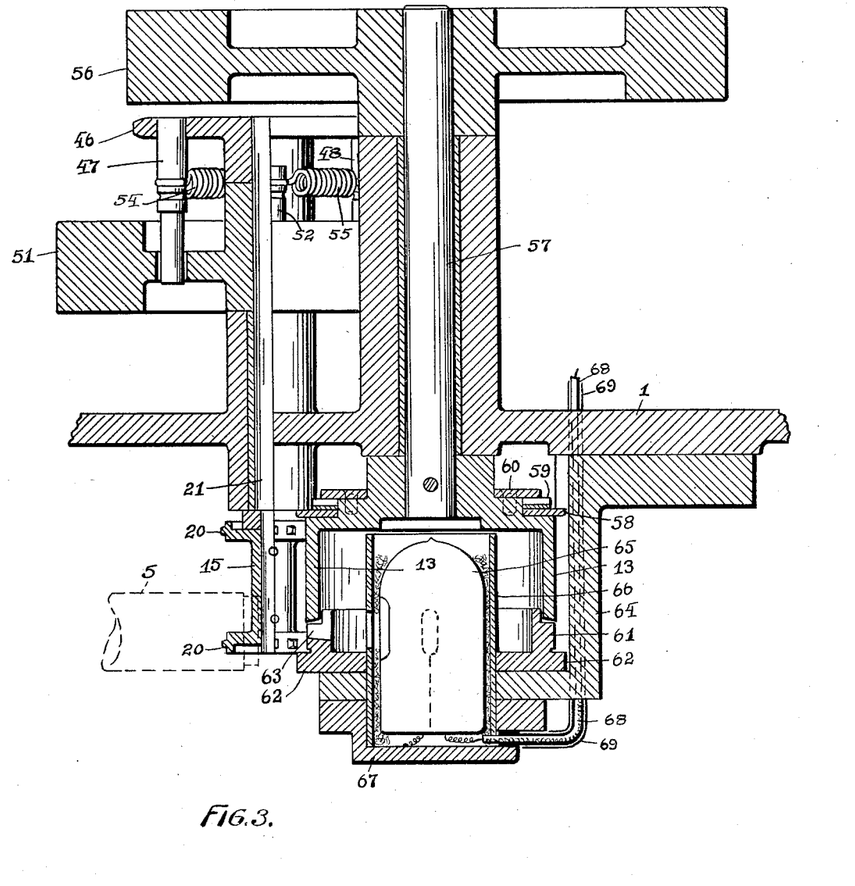
Figure 3 is an enlarged detail horizontal section of a portion of the apparatus, illustrating the construction of the film control unit and the driving mechanism of the apparatus, the section being taken on the line 3x—3x of Figure 1.
Figure 4:
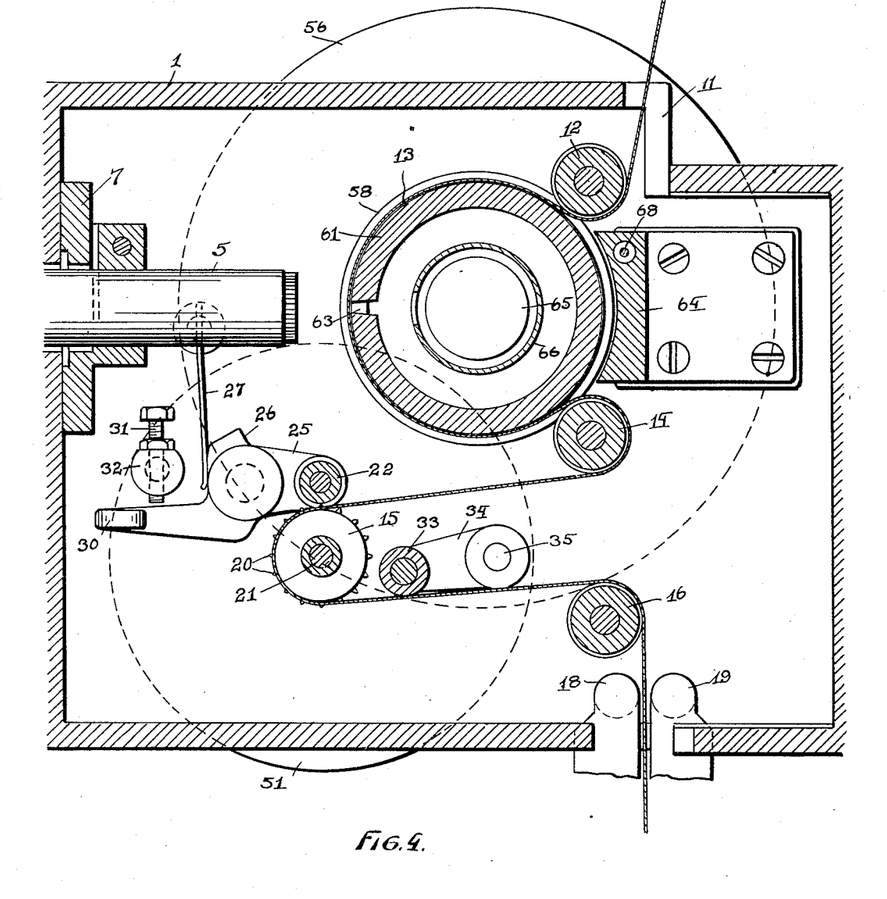
Figure 4 is an enlarged vertical sectional view of a portion of the apparatus including the film control unit, the section being taken on the line 4x—4x of Figure 2.

The aperture 63 comprises a rectangular radial slot cut into the edge of the fixed circular flange 61. The end, top and bottom of this slot are tapered so as to gradually increase the size of the aperture as it extends thru the circular flange to permit the light rays to spread as they pass thru the opening. The other end of the aperture formed by the outer edge of the control wheel is correspondingly tapered by slightly undercutting the edge of the control wheel as illustrated in section in Figure 3.

The aperture 63 is located in the stationary circular flange so that the sound record portion of the film which overhangs the control wheel passes in front of it while the remainder of the film travels over the control wheel. The optical system 5 by which the light rays of constant luminosity are projected from the exciter lamp 2 is in line with the aperture 63 and focuses a beam of light .001 of an inch wide and .100 of an inch long onto the sound record portion of the film in front of the aperture 63. The light rays from this beam of light are then modified by the varying opacity of the sound record so that the variations in these light rays enter the aperture behind the film and are projected onto the light sensitive cell 65. In accordance with the variations in the opacity of the light rays when passing thru the film record to the light sensitive cell, the resistance thereof causes correspondingly varying impulses in the electric circuit of the sound reproducing device which translates the film record into actual sound.

It has been found that in some cases the fly wheel 56 may be eliminated so that the feeding of the film is entirely controlled by the action of the governor wheel 51 and its yielding connection with the driving sprocket 46. The momentum of the governor wheel alone then serves as the means for feeding the film at a uniform rate of speed while the control wheel simply acts as an idler which guides the film in a straight path and presents the sound portion of the film to the beam of light while it travels over the fixed aperture located adjacent to the control wheel.

I claim:

1. In an apparatus for reproducing sound film records having means for feeding the film containing the sound record, the combination of a control wheel adapted to be rotated by the rolling contact between the film and the control wheel to create a momentum in said control wheel that will set up a tension in said film against said feeding means and hold the film taut and smooth during its travel over said control wheel, a fixed flange having an aperture therein located adjacent to said control wheel and having the sound record portion of the film overhang it and pass over it during the travel of the film over said control wheel, means for projecting light rays thru the sound record of the film into the aperture of said flange while the film travels over said control wheel and is held taut and smooth thereby and means for translating the light rays into sound.

2. In an apparatus for reproducing sound film records the combination of a control unit comprising a rotating control wheel and a fixed concentric flange of slightly smaller diameter than that of said control wheel located adjacent to said control wheel, a fixed guide on the outer edge of said concentric flange and a yielding guide on the inner edge of said control wheel adapted to guide the film over said control wheel and said concentric flange with the sound record of the film overhanging said stationary concentric flange, said stationary concentric flange having an aperture therein and means for projecting a light beam thru the film into said aperture.

3. In an apparatus for reproducing sound film records the combination of a control unit comprising a rotating control wheel and a hollow and stationary concentric flange of smaller diameter than said control wheel located adjacent to said control wheel, said stationary flange having a radial aperture therein, a guide carried by said control wheel and a guide carried by said flange; a light sensitive cell mounted in said stationary flange, a constant light source, and means for projecting a beam of light from said constant light source into said aperture of said concentric flange and onto said light sensitive cell located within it while the film is guided by said guides to simultaneously travel at a uniform rate of speed over said control wheel and said concentric flange in a predetermined alignment therewith and out of frictional contact with said concentric flange.

4. In an apparatus for reproducing sound film records the combination of a casing, a film control unit including a control wheel and light sensitive cell mounting, a light sensitive cell, a source of constant luminosity, an optical system for projecting a light beam from said light source thru the film onto said light sensitive cell, a mounting bracket for said optical system, a vertical ridge on said bracket, and means for adjustably clamping said bracket with its vertical ridge against said casing so as to permit a vertical rocking of said bracket on said casing and provide a horizontal adjustment of said optical system thru a limited arc in front of said light sensitive cell.

5. In an apparatus for reproducing sound film records the combination of a control unit comprising a rotating control wheel adapted to have the film travel over it to rotate said wheel, a stationary concentric extension of reduced diameter adjacent to said control wheel to have a portion of the film traveling over the control wheel overhang said stationary extension without making frictional contact therewith, guide means adjacent to said stationary extension and yielding guide means adjacent said control wheel for forcing the edge of the film against the guide means adjacent to said stationary extension and have a uniform predetermined portion of the film overhang said stationary extension.

6. In an apparatus for reproducing sound film records, the combination of a control unit comprising a rotating control wheel adapted to have the film travel over it to rotate said wheel, a stationary concentric extension adjacent to said control wheel to have a portion of the film traveling over the control wheel overhang said stationary extension, guide means engaging the edges of the film and cooperating with said control wheel and said extension to guide the film so as to have a uniform predetermined section of the film travel over said extension.

7. In an apparatus for reproducing sound film records, the combination of a control unit comprising a cylindrical control unit adapted to have the film travel over it, a cylindrical extension adjacent to said control, unit and concentric thereto adapted to have a portion of the film overhang said extension on its travel over said control unit, guide means engaging the edges of the film and cooperating with said control unit and its extension to guide the film so as to have a uniform predetermined section of the film travel over said extension.

In testimony whereof I affix my signature.

FRED H. PALSER.